Patented Nov. 19, 1940

2,221,778

UNITED STATES PATENT OFFICE 2,221,778

ACID-RESISTANT RESIN PRODUCTS

William R. Collings, Richard D. Freeman, and Richard M. Upright, Midland, Mich., assignors to The Dow Chemical Company, Midland, Mich., a corporation of Michigan No Drawing. Application February 25, 1938, Serial No. 192,500

11 Claims. (Cl. 260—51)

This invention concerns a new acid-resistant thermo-setting resin material, the preparation thereof, and products molded therefrom.

We have discovered that a water-insoluble thermo-setting resin material can be prepared according to the hereinafter described procedure, in which the principal steps are: (1) digesting lignin with a hot aqueous solution comprising a substantial proportion of a water-soluble phenolate, (2) condensing an aldehyde with the digestion product, (3) acidifying the resulting liquid, and (4) separating the thermo-setting material so produced.

According to the invention, the process is carried out by heating lignin in a solution of a phenolate at a temperature between 150° C. and the decomposition temperature of the mixture, and preferably between 170° and 180° C. The mixture is preferably agitated while heating under the vapor pressure of the reactants at the temperature used. After the lignin is substantially completely digested in the treating liquor, the reaction mixture is preferably cooled, generally to a temperature between 50° and 80° C. and an aldehyde added thereto. The reaction mixture is then thoroughly agitated and maintained at a temperature below 150° C. for a period of time required to cause condensation and produce a material having the properties desired, but insufficient to cause precipitation of the condensation product from solution. Following completion of the aldehyde condensation step, the temperature of the reaction solution is adjusted to between 20° and 40° C. and the solution acidified to precipitate the thermo-setting material. The precipitated product is separated by any suitable means, e. g. filtration or decantation, and washed with water or dilute aqueous alkaline solution to remove acid residue therefrom. The moist resin material is dried at temperatures below 100° C. for a period of time sufficient to reduce the moisture content thereof to below 8 per cent, but insufficient to cause material alteration in the flow characteristics of the product. This dried resin intermediate is then adapted for use in the preparation of a variety of molded products.

Various modifications may be made in the procedure described in the foregoing paragraph. For example, in the digestion step, alkaline material in addition to the phenolate advantageously may be employed in the treating liquor. If such additional alkali is employed in the digestion step, then preferably it is neutralized before adding the aldehyde to the digestion product. The acidification of the aldehyde condensation product may be carried out by pouring such product into an acid solution, in which case the resin is precipitated in a finely divided, amorphous form, or by adding the acid to the condensation product, whereby the resin is precipitated in the form of spongy aggregates.

In carrying out the foregoing procedure, at least 0.01 pound-mole of a water-soluble phenolate is required for each pound of lignin to be digested, and amounts thereof up to 0.02 pound-mole per pound of lignin, or higher, may be employed. Sufficient water is employed to form a solution containing from about 12 to 25 per cent by weight of the phenolate. If additional alkali is used in the digestion liquor, it should not exceed about 0.02 pound-mole per pound of lignin to be digested. The quantity of aldehyde required is equal to at least 1.25 molar equivalents for each mole of phenolate employed. 2.0 to 2.5 equivalents of aldehyde for each equivalent of phenolate has been found particularly satisfactory. If additional alkali has been employed in the digestion step and not neutralized prior to the addition of aldehyde, greater amounts of aldehyde may be required in the condensation step to obtain optimum yields, due to the reaction of aldehyde with such alkali.

The lignin employed in the reaction may be obtained by any of the usual means for isolation of the same from ligno-cellulosic materials, such as wood. Ammonium, alkaline earth metal, or alkali metal phenolates may be used, for example, sodium phenolate, potassium phenolate, barium phenolate, sodium - ortho - cresolate, barium-ortho-cresolate, potassium - para-cresolate, sodium xylenolate, ammonium-4-chloro-phenolate, calcium-2-chloro-phenolate, sodium-tertiary - butyl - phenolate, potassium chloro-cresolates, and water-soluble metal salts of technical cresylic acid mixtures. The additional alkali optionally employed in the digestion liquor, can be an alkali metal hydroxide, carbonate or bicarbonate, such as sodium hydroxide, potassium hydroxide, potassium carbonate, sodium bicarbonate, and the like. Substantially any aldehyde, e. g. acetaldehyde, formaldehyde, butyraldehyde, benzaldehyde, salicylaldehyde, furfuraldehyde, and the like, can be employed in the reaction. Any water-soluble organic or inorganic acid may be employed in the acidification step, or in the neutralization of additional alkali if used in the digestion step, e. g. sulphuric acid, hydrochloric acid, nitric acid, boric acid, acetic acid, formic acid, and the like. Acid salts such as aluminum sulphate, zinc chloride, ammonium sulphate, copper nitrate, etc., may be substituted for the free acid, if desired.

The thermo-setting condensation product obtained according to the above described procedure can be molded at suitable temperatures and pressures to produce an infusible resin having desirable properties. However, it is generally advantageous to incorporate fillers or other modifying agents before molding. The filler may be suspended in the liquor in the condensation step before acidification, whereby the condensation product is precipitated thereon, or may be incorporated after precipitation, along with other modifying agents such as pigments, dyes, plasticizers, lubricants, and the like.

Among the fillers suitable for use are inert fibrous materials or finely divided mineral substances, such as asbestos fiber, wood flour, sawdust, cotton flock, rubber dust, sisal hemp fibers, diatomaceous earth, bentonite, sand, cellulose fiber, mica graphite, etc. Other modifying agents include calcium stearate, tung oil, natural resins, inorganic pigments, organic dyes, and the like. If a slightly alkaline molding composition is desired, calcium hydroxide or other suitable inorganic alkali may be incorporated with the dried condensation product.

While the temperatures and pressures required for molding the thermo-setting material vary with the particular reactants and the amounts thereof employed, and the conditions of temperature and pressure prevailing during the reaction, temperatures of approximately 140°–160° C. and a pressure of about 2000 pounds per square inch have been found satisfactory in most instances for molding the compositions produced, such molding operations having a cycle of 3 to 5 minutes or more depending upon the size of the article fabricated.

The products prepared as described above are substantially insoluble in both hot and cold alcohol and most other common organic solvents; not decomposed, hydrolyzed or appreciably swelled by prolonged exposure to water or sulphuric acid; substantially odorless; bond well with and are non-corrosive to metals; have a high heat resistance; can be exposed to elevated temperatures without charring, discoloring, or becoming brittle; and have good dielectric properties and high mechanical strength.

The following examples illustrate certain embodiments of the invention, but are not to be construed as limiting the same:

Example 1

4.63 pounds of phenol, 1.95 pounds of anhydrous sodium hydroxide, and 47.5 pounds of water were mixed together, 2.5 pounds of finely divided lignin added thereto, and the mixture heated under pressure at a temperature of 172°–178° C. for 12 hours, at the end of which time the lignin was substantially completely digested. The mixture was then cooled to 60° C. and 7.25 pounds of a 40 per cent formaldehyde solution mixed therewith. This mixture was warmed at 95°–105° C. for 45 minutes, cooled to 40° C., and poured into approximately 12.5 pounds of 20 per cent aqueous hydrochloric acid, whereby a finely divided water-insoluble resin precipitated. The precipitated resin was filtered from the liquor, washed free of acid and salt with distilled water, and air dried at 25° C. until the moisture content was reduced to 7 per cent by weight.

A molding composition was prepared containing 70 parts by weight of the above resin, 30 parts of commercial rubber dust, 1 part of calcium hydroxide, 2 parts of sodium stearate, and 4 parts of carbon black. This composition was intimately mixed by grinding in a ball mill and molded into battery tops at a temperature of 150° C. and a pressure of 2000 pounds per square inch, the molding cycle being 3 minutes. The molded article had a hard, glossy, black surface, a density of approximately 1.3, and a tensile strength of 2700 pounds per square inch. A sample was immersed in a test cell containing battery strength sulphuric acid for 109 days at temperatures ranging up to 50° C., the cell being alternately charged and discharged during the test. The molded resin withstood this treatment without decomposition or change.

Small test pieces were cut from a portion of a freshly molded battery top, weighed and measured, and subjected to the action of water and sulphuric acid to determine their resistance to hydrolysis, decomposition, and swelling. After 6 hours immersion in boiling 48 per cent sulphuric acid, these test pieces showed a weight loss of approximately 2 per cent. Immersion for 24 hours in boiling 10 per cent sulphuric acid resulted in a reduction of only 1.6 per cent in weight. Immersion for 24 hours in boiling water caused the resin pieces to lose 1.7 per cent in weight. Discs, 4 inches in diameter and 0.132–0.142 inch thick were molded from the above composition and tested under standard A. S. T. M. conditions to determine the dielectric breakdown and dielectric fatigue values for the product. Dielectric break down of the molded material was 340 volts per mil. After immersion in water for 48 hours, the break down was 265 volts per mil. The dielectric fatigue value of the freshly molded product was found to be 290 volts per mil per minute.

Example 2

5.0 pounds of lignin was completely digested by heating under pressure at 180° C. for 6 hours with a solution composed of 9.24 pounds of sodium phenolate, 3.5 pounds of sodium hydroxide, and 45 pounds of water. The reaction mixture was then cooled to 40° C. and partially neutralized with 8 pounds of 32 per cent hydrochloric acid, warmed to 60° C., and reacted with 14.5 pounds of 40 per cent formaldehyde solution. The mixture was then heated to 90°–105° C. for 45 minutes to complete the condensation, and thereafter cooled to 45° C. The pH of the cooled mixture was subsequently reduced to below 5 by admixture with 25 pounds of a 20 per cent hydrochloric acid solution, whereby the resin was precipitated. This precipitate was filtered from the aqueous solution, washed free of acid and salt with distilled water, and air dried at 25° C. for several days, obtaining 13 pounds of a finely divided light brown resin product having a moisture content of approximately 7 per cent by weight.

98 parts by weight of the resin obtained in the above example was ground with 2 parts by weight of sodium stearate, the function of the latter being that of a molding lubricant. Test pieces were molded from this composition at a temperature of 150° C., and a pressure of 2000 pounds per square inch. After immersion for 24 hours in boiling water, the samples showed an average loss of 2.12 per cent in weight and a shrinkage of 0.3 per cent in thickness. 24 hours immersion of the samples in 10 per cent sulphuric acid resulted in a weight loss of 1.98 per cent and a shrinkage of 0.44 per cent. 6 hours immersion in boiling 40 per cent sulphuric acid resulted in a weight loss of approximately .2 per cent and a shrinkage of 0.31 per cent. The freshly molded material was odorless, had a dielectric break down value of 330 volts per mil, and tensile and impact strengths of 2000 pounds and 0.56 foot pounds per square inch, respectively.

*Example 3*

A solution was prepared by dissolving 9.05 pounds of sodium cresolate and 3.5 pounds of sodium hydroxide in 45 pounds of water, 5 pounds of lignin was added thereto, and the mixture heated under pressure for 5 hours at 180° C. The mixture was then cooled to approximately 40° C. and partially neutralized with 8 pounds of 32 per cent hydrochloric acid. 14.5 pounds of 40 per cent formaldehyde was then mixed therewith and the mixture heated with stirring at 95°–105° C. for 45 minutes. The aqueous reaction product was cooled to 40° C., mixed with 5.5 pounds of commercial wood flour, and poured into 2.5 pounds of 20 per cent hydrochloric acid. The solid constituents of the mixture were separated, washed with distilled water, and dried at 25° C. for several days, obtaining 18.5 pounds of a filled resin product having a moisture content of approximately 7 per cent.

98 parts by weight of the above filled resin product was intimately mixed with 2 parts by weight of sodium stearate and molded substantially as described in the preceding examples to form ash trays, and similar small articles. After 24 hours immersion in boiling 10 per cent sulphuric acid, test pieces of this molded resin lost only 1.25 per cent in weight. The molded resin was difficultly flammable and resistant to charring, discoloration, and embrittlement upon exposure to high temperatures. It was odorless, and had tensile and impact strengths of 3430 pounds and 0.93 foot pounds per square inch, respectively.

*Example 4*

5 pounds of finely divided lignin was suspended in a solution consisting of 8.85 pounds of sodium xylenolate, 3.5 pounds of sodium hydroxide, and 45 pounds of water. This mixture was heated under pressure to 175°–180° C. for 6 hours, cooled to 40°–50° C., and partially neutralized with 8 pounds of 30 per cent hydrochloric acid. 14.5 pounds of 40 per cent formalin was added and the mixture heated with stirring at 95°–105° C. for 45 minutes to condense the aldehyde with the xylenolate-lignin complex. The reaction mixture was cooled to below 40° C. and acidified with 25.0 pounds of 20 per cent hydrochloric acid, whereby a finely divided resin was precipitated. This precipitate was filtered off, washed free of acid and salt with distilled water, and air-dried at room temperature, 13 pounds of a finely divided light brown resin being obtained.

A mixture of 70 parts by weight of the dried resin, 30 parts of sand, 1 part of calcium hydroxide, 2 parts of sodium stearate, and 4 parts of zinc chromate was ground in a ball mill and molded as described in Example 1. The molded resin had a dielectric breakdown value of 320 volts per mil. After 48 hours immersion in water, it had a dielectric break down of 270 volts per mil. The dielectric fatigue of the freshly molded material was 265 volts per mil per minute.

Molded compositions containing the thermosetting condensation product and asbestos fiber were found to be very difficultly flammable. A composition containing 30 per cent by weight of asbestos fiber had an impact strength of 0.65 foot pounds per square inch. Test blanks of the latter composition immersed for 24 hours in boiling 95 per cent ethyl alcohol showed a loss in weight of less than 2 per cent and an increase in thickness due to swelling of 0.6 per cent. In a similar test in which samples of the freshly molded product were immersed in 75 per cent ethyl alcohol for 3 weeks, the loss in weight was less than 1.37 per cent, accompanied by a shrinkage of approximately 0.08 per cent. The surface resistance of the resin to the solvent action of the alcohol was excellent.

*Example 5*

5.0 pounds of lignin was heated under pressure at 180° C. for 6 hours with a solution composed of 9.0 pounds of sodium phenolate, 3.5 pounds of sodium hydroxide, and 45 pounds of water. The reaction mixture was then cooled to 40° C. and partially neutralized with 8 pounds of 32 per cent hydrochloric acid, warmed to 60° C., and reacted with 14.5 pounds of 40 per cent formaldehyde solution. The mixture was then heated with stirring at 95°–105° C. for 45 minutes to complete the condensation, and cooled to 40° C.

1 pound of paper pulp was beaten in 50 pounds of water in a Niagara beater for 15 minutes, whereby the fibers of the pulp were moderately hydrated. 2.5 pounds of a size containing 2 per cent wood rosin was then added to the beaten pulp and the mixture agitated for 5 minutes. 600 milliliters of the aqueous formaldehyde-phenolate-lignin reaction mixture, as prepared above, was then added to the pulp-size mixture and agitation maintained for an additional 10 minutes. The mixture was then acidified with 30 per cent hydrochloric acid to a pH of 5 to precipitate a thermo-setting resin material on the pulp. The suspended filled resin product was then formed into pulp sheets by standard paper-making methods, and these sheets dried at 25° C. until their moisture content was below 8 per cent. Several thicknesses of the dried sheets were molded together at a temperature of 150°–165° C. and at a pressure of 2000 pounds per square inch to form a readily machinable board in which the thermo-set resin and fibers were bound together in a homogeneous composition. This board was infusible, hard, dense, unaffected by heat, and impervious to moisture, sulphuric acid, and common organic solvents. The term "lignin," as employed in the following claims, refers to the ligneous material derived from wood and other ligno-cellulosic substances, which is substantially free from cellulosic bodies.

Other modes of applying the principle of our invention may be employed instead of those explained, change being made as regards the products and methods herein disclosed, provided the compositions or steps stated by any of the following claims or the equivalent of such stated compositions or steps be employed.

We therefore particularly point out and distinctly claim as our invention:

1. A thermo-setting resin adapted to be molded into bodies characterized by their resistance to hydrolysis, swelling, and decomposition on contact with sulphuric acid and water, obtained by digesting lignin with an aqueous solution comprising a water-soluble salt of a phenol, condensing the resulting phenolate-lignin reaction mixture with an aldehyde under such conditions as will not cause precipitation, acidifying the aqueous product to cause precipitation of the resin, and separating and drying the precipitate.

2. A thermo-setting resin adapted to be molded into infusible bodies characterized by their resistance to hydrolysis, swelling and decomposition on contact with sulphuric acid and water, obtained by digesting lignin with an aqueous solution comprising a water-soluble salt of a phenol, adding an aldehyde to the digested mixture, heating the mixture for a period of time sufficient to cause reaction of the aldehyde with the digestion product but insufficient to cause precipitation, suspending a filler in the reaction mixture, acidifying the mixture to deposit a solid resin product upon the filler, and separating and drying the solid constituents of the mixture.

3. A molded thermo-set resin composition obtained by molding under heat and pressure the product defined by claim 1 and characterized by its high resistance to decomposition by heat, good dielectric properties, insolubility in alcohol, and resistance to hydrolysis, swelling, and decomposition on prolonged contact with sulphuric acid and water.

4. A molded thermo-set resin composition obtained by molding under heat and pressure the product defined by claim 2 and characterized by its high resistance to decomposition by heat, good dielectric properties, insolubility in alcohol, and resistance to hydrolysis, swelling, and decomposition on prolonged contact with sulphuric acid and water.

5. A process for preparing an acid-resistant thermo-setting resin which comprises digesting lignin in a hot aqueous solution comprising a water-soluble phenolate, adding an aldehyde to the digested mixture, heating the mixture for a period of time sufficient to cause reaction of the aldehyde with the digestion product but insufficient to cause precipitation, acidifying the aqueous product to cause precipitation of the resin, and separating the precipitate.

6. A process for the production of an acid-resistant thermo-setting resin which comprises digesting lignin in a hot aqueous solution of a water-soluble alkali metal salt of a phenol, adding an aldehyde to the digested mixture, heating the mixture for a period of time sufficient to cause reaction of the aldehyde with the digestion product but insufficient to cause precipitation, acidifying the aqueous product to cause precipitation of the resin; and separating the precipitate.

7. The process of forming an acid-resistant resin product which comprises the steps of digesting lignin in a hot aqueous solution of a water-soluble alkali metal salt of a phenol, adding an aldehyde to the digested mixture, heating the mixture for a period of time sufficient to cause reaction of the aldehyde with the digestion product but insufficient to cause precipitation, suspending a filler in the liquid product, acidifying the suspension whereby a water-insoluble resin material is deposited in the filler, separating the solids from the mixture, washing and drying the same, and molding the dried product under heat and pressure.

8. A process for the production of an acid-resistant thermo-setting resin which comprises digesting lignin in a hot aqueous solution containing an inorganic alkali and a water-soluble salt of a phenol, adding an aldehyde to the digested mixture, heating the mixture for a period of time sufficient to cause reaction of the aldehyde with the digestion product but insufficient to cause precipitation, acidifying the aqueous product to cause precipitation of the resin, and separating the precipitate.

9. A process for the production of an acid-resistant thermo-setting resin which comprises digesting lignin in a hot aqueous solution containing an inorganic alkali and a water-soluble alkali metal salt of a phenol, partially neutralizing the free alkali, adding an aldehyde to the partially neutralized digestion mixture, heating the mixture for a period of time sufficient to cause reaction of the aldehyde with the digestion product but insufficient to cause precipitation, acidifying the aqueous product to cause precipitation of the resin, and separating the precipitate.

10. A process for the production of an acid-resistant thermo-setting resin which comprises the steps of digesting lignin in a hot aqueous solution of sodium phenolate, adding the aldehyde to the digested mixture, heating the mixture for a period of time sufficient to cause reaction of the aldehyde with the digestion product but insufficient to cause precipitation, acidifying the aqueous product to cause precipitation of the resin, and separating the precipitate.

11. A thermo-setting resin adapted to be molded into fusible bodies characterized by their resistance to hydrolysis, swelling and decomposition on contact with sulphuric acid and water, obtained by digesting lignin with an aqueous solution comprising a water-soluble salt of a phenol, adding an aldehyde to the digested mixture, heating the mixture for a period of time sufficient to cause reaction of the aldehyde with the digestion product but insufficient to cause precipitation, acidifying the aqueous product to cause precipitation of the resin, and separating the precipitate.

WILLIAM R. COLLINGS.
RICHARD D. FREEMAN.
RICHARD M. UPRIGHT.